United States Patent [19]
Okada et al.

[11] Patent Number: 5,307,227
[45] Date of Patent: Apr. 26, 1994

[54] MAGNETIC RECORDING/REPRODUCING APPARATUS CAPABLE OF HIGH-DENSITY RECORDING ON A MAGNETIC TAPE GUIDED AT HIGH SPEED

[75] Inventors: Hideo Okada; Hiroaki Takeuchi; Tohru Okuda, all of Nara, Japan

[73] Assignee: Sharp Kabushiki Kaisha, Osaka, Japan

[21] Appl. No.: 855,110

[22] Filed: Mar. 20, 1992

[30] Foreign Application Priority Data

Aug. 6, 1991 [JP] Japan .................................. 3-196511

[51] Int. Cl.$^5$ .............................................. G11B 5/187
[52] U.S. Cl. .................................................. 360/122
[58] Field of Search .......................................... 360/122

[56] References Cited

U.S. PATENT DOCUMENTS

| | | | |
|---|---|---|---|
| 4,839,959 | 6/1989 | Mersing | 29/603 |
| 4,875,129 | 10/1989 | Favrou et al. | 360/122 |
| 4,888,657 | 12/1989 | Lacey et al. | 360/122 |
| 4,956,737 | 9/1990 | Brock | 360/122 |
| 5,055,959 | 10/1991 | Saliba | 360/122 |
| 5,140,483 | 8/1992 | Koga et al. | 360/107 |
| 5,202,807 | 4/1993 | Okada et al. | 360/122 |

FOREIGN PATENT DOCUMENTS 59-16119 1/1984 Japan .

*Primary Examiner*—John H. Wolff
*Assistant Examiner*—David D. Davis
*Attorney, Agent, or Firm*—Nixon & Vanderhye

[57] ABSTRACT

In order to obtain a desired output characteristic in magnetic recording/reproducing apparatus, a proper range of magnetic tape wrap angles on a magnetic head are determined according to the following expressions, taking account of tension:

$$0.5(\beta_{in} - \gamma) \leq (\beta_{out} - \gamma) \leq 2(\beta_{in} - \gamma)$$

and $\beta_{in} + \beta_{out} \leq 2\gamma + 4.0°$ where
$\gamma = -0.2$ (deg·mm/gf) $\times$ T(gf/mm) + 0.6°,
$\beta_{in}$ is a wrap angle of an approaching magnetic tape and
$\beta_{out}$ is a wrap angle of a leaving magnetic tape.

7 Claims, 16 Drawing Sheets

MAGNETIC RECORDING/REPRODUCING APPARATUS CAPABLE OF HIGH-DENSITY RECORDING ON A MAGNETIC TAPE GUIDED AT HIGH SPEED

BACKGROUND OF THE INVENTION

1. Field of the Invention

The present invention generally relates to magnetic recording/reproducing apparatus for recording/reproducing signals of high density onto/from the magnetic tape at a high transfer rate by guiding a magnetic tape at high speed and, more particularly, relates to configurations of magnetic heads and magnetic tape wrap angles relative to the magnetic heads.

2. Description of the Related Art

In a field of magnetic recording/reproducing in which signals of high density are recorded/reproduced on/from a magnetic tape guided at high speed, one example of magnetic recording/reproducing apparatus was disclosed in Japanese Patent Publication No. 63-49308, which is effective to maintain a good contact condition between a magnetic tape and a slide face of a magnetic head. What was disclosed in the patent will now be described with reference to FIG. 16.

There is a magnetic gap 100 at the top of a magnetic head 101 in the magnetic recording/reproducing apparatus. A magnetic tape 110 contacts with a magnetic head 101 on a slide face 102 in a sliding manner. In the figure, $\alpha$'s represent angles between a direction of a chord joining both ends 104, 105 on slide face 102 and the directions of tangents at ends 104, 105, and $\beta_{in}$, $\beta_{out}$ represent angles between the chordal direction above and the direction of magnetic tape 110 coming in and out of contact with the ends 104, 105 on slide face 102. The angles $\beta_{in}$, $\beta_{out}$ will be hereinafter referred to as "tape wrap angles".

Tape wrap angle $\beta_{in}$ represents a tape wrap angle with which magnetic tape 110 approaches slide face 102 (the side of end 104) (therefore hereinafter referred to as approaching tape wrap angle), and $\beta_{out}$ represents a tape wrap angle with which magnetic tape 110 leaves slide face 102 (the side of end 105) (hereinafter referred to as leaving tape wrap angle). Tape wrap angles $\beta_{in}$, $\beta_{out}$ are determined by positions of tape guides 108, 109, for example. Force restricting magnetic tape 110 is generated at both ends 104, 105 of slide face 102 by setting values of $\beta_{in}/\alpha$, $\beta_{out}/\alpha$ to larger than 1 in the arrangement above.

Magnitudes of restricting force $F_{in}$, $F_{out}$ (where "in", "out" indicate the approaching and leaving sides, respectively) per unit width of magnetic tape 110 controlled as stated above are given by the following equations:

$$F_{in} = T \sin (\beta_{in} - \alpha) \quad (1)$$

$$F_{out} = T \sin (\beta_{out} - \alpha) \quad (2)$$

where T is tape tension per unit width of magnetic tape 110.

Pressing force is generated on slide face 102 by the tape tension T per unit width above, which is given by the following equation:

$$f = T/R \quad (3)$$

where R is a radius of the curvature of slide face 102.

In this case, when magnetic tape 110 is guided in the direction indicated by the arrow A in the figure, magnetic tape 110 moves in a stable manner under the condition that the restricting forces $F_{in}$, $F_{out}$ and the pressing force f are in harmony with an air film pressure between slide face 102 of magnetic head 101 and magnetic tape 110.

FIG. 17 is a diagram of a spacing distribution when the values of $\beta_{in}/\alpha$, $\beta_{out}/\alpha$ are 1.2–2.5 as described in Japanese Patent Publication No. 63-49308. The spacing distribution is a distribution of a gap (hereinafter referred to as spacing) between magnetic tape 110 on slide face 102 of magnetic head 101 and slide face 102.

As shown in FIG. 17, the spacing is virtually constant and small over slide face 102. This means that the spacing of magnetic gap 100 on slide face 102 of magnetic head 101 is hardly affected by the moving direction of magnetic tape 110 and disturbance such as vibrations, and a good electromagnetic converting characteristic can be provided at magnetic gap 100.

The effect described above is due to the restricting forces $F_{in}$, $F_{out}$. Appropriate setting of the values of $\beta_{in}/\alpha$, $\beta_{out}/\alpha$ is disclosed, for example, in U.S. Pat. No. 4,888,657, U.S. Pat. No. 4,875,129, and Japanese Patent Laying-Open No. 59-16119. According to the references, an air bearing face is formed on the same circumference as that of the slide face having the magnetic gap.

As a representative of the prior art, a magnetic head configuration according to U.S. Pat. No. 4,888,657 is shown in FIG. 18.

In FIG. 18, a magnetic head 101 includes a slide face 102 having a cylindrical shape with a magnetic gap 100. Slots 103a, 103b are formed on slide face 102 at both sides of magnetic gap 100, extending at right angles with the moving direction of magnetic tape 110. Slide face 102 is divided into three raised faces 102a, 102b and 102c by slots 103a and 103b.

In this case, when magnetic tape 110 is guided as far as raised faces 102b and 102c of slide face 102 by tape guides 108 and 109, magnetic tape 110 is restricted by both ends 104, 105 of raised face 102a having the magnetic gap 100 and ends 106, 107 of raised faces 102b, 102c to be air bearing faces. As a result, the magnetic tape wrap angles, $\beta_{in}$, $\beta_{out}$ on raised face 102a are set stably. That is, end 106 of raised face 102b and end 107 of raised face 102c serve as guides, which correspond to tape guides 108, 109 of FIG. 16, respectively.

In the conventional technique (FIGS. 16 and 18), however, even if the values of $\beta_{in}/\alpha$, $\beta_{out}/\alpha$ are set to 1.2 to 2.5, a good spacing characteristic is not necessarily obtained for some tape tension. Here, the spacing characteristic means a characteristic of a spacing and spacing distribution.

This problem will now be described with reference to FIG. 19.

FIG. 19 is a diagram showing a spacing distribution relative to tape tension when the tape wrap angles are set so that $\beta_{in}/\alpha = \beta_{out}/\alpha = 1.2$ to 2.5, and magnetic tape 110 is guided in the direction of the arrow A in FIGS. 16 and 18.

In the figure, the solid line indicates a spacing distribution when the tape tension is optimized. The dot-and-dash line indicates a spacing distribution when the tape tension is rather low. The dotted line indicates a spacing distribution when the tape tension is rather high. That is, when the tape tension is low, magnetic tape 110 flies by a fluid lubrication effect as a restriction effect on magnetic tape 110 on end 104 of slide face 102 of FIG.

16 or raised slide face 102a of FIG. 18 is small. When the tape tension is high, the restricting force of the tape on the both ends 104, 105 of slide face 102 of FIG. 16 or raised face 102a of FIG. 18 is large and stiffness of magnetic tape 110 is increased, so that magnetic tape 110 flies due to deformation of tape 110 at magnetic gap 100.

A second problem in the conventional technique will now be described.

This problem is due to the difference between the approaching tape wrap angle $\beta_{in}$ and the leaving tape wrap angle $\beta_{out}$ in FIGS. 16 and 18.

FIG. 20 is a diagram showing a change of a spacing distribution with the leaving tape wrap angle $\beta_{out}$ being constant while the approaching tape wrap angle $\beta_{in}$ being changed. In this case, the values of $\beta_{in}/\alpha$, $\beta_{out}/\alpha$ are in the range of 1.2 to 2.5. The spacing distribution in this case varies with tape tension. In the figure, the solid line, the dot-and-dash line, and the dotted line indicate spacing distributions when $\beta_{in} = \beta_{out}$, $\beta_{in} << \beta_{out}$, and $\beta_{in} >> \beta_{out}$, respectively. That is, for some tape tensions set, when there is a large difference between the approaching tape wrap angle $\beta_{in}$ and the leaving tape wrap angle $\beta_{out}$, a good contact condition cannot be created between magnetic tape 110 and slide face 102 of magnetic head 101 (FIG. 16), or magnetic tape 110 and raised slide face 102a of magnetic head 101 (FIG. 18).

A third problem in the conventional technique will now be described.

This problem is related to a distance between guides for setting the tape wrap angles $\beta_{in}$, $\beta_{out}$. A spacing characteristic changes depending on distance between guides. For example, a spacing characteristic with a relatively long distance between the guides, such as, the distance between tape guides 108, 109 shown in FIG. 16 is different from that with a short distance, such as, the distance between end 106 of raised face 102b and end 107 of raised face 102c in FIG. 18.

FIG. 21 is a diagram for describing the problem above.

In this case, the tape tension and the tape wrap angles are so set that a good spacing characteristic is obtained with a short distance between the guides. In the figure, the solid line and the dot-and-dash line indicate spacing distributions with a short distance and a long distance between the guides, respectively.

As shown in the figure, since the spacing characteristic varies with the distance between the guides, the tape tension and the tape wrap angles must be set appropriately according to the distance in order to obtain a good spacing characteristic.

As described above, the first, second and third problems indicate that the spacing characteristic is determined by a correlation between the guide distance, the approaching tape wrap-angle $\beta_{in}$, and the leaving tape wrap angle $\beta_{out}$ and if these parameters are set inappropriately, a good spacing characteristic cannot be obtained. In this case, magnetic gap 100 of magnetic head 101 cannot display a full electromagnetic converting characteristic. This becomes more significant with shorter recording wavelength on magnetic tape 110.

SUMMARY OF THE INVENTION

Therefore, an object of the present invention is to appropriately set approaching and leaving tape wrap angles so that a better output characteristic may be obtained depending on tape tension and the distance between tape guides.

The above-mentioned objects of the present invention are achieved by operating, under the following conditions, magnetic recording/reproducing apparatus including a magnetic head having a magnetic gap on a slide face of convex surface, which a flexible magnetic recording medium such as a magnetic tape comes in contact with.

That is, in magnetic recording/reproducing apparatus according to the present invention, tape wrap angles between a magnetic head having a magnetic gap on a slide face of a cylindrical shape the chord of which is 150 micron or less and a magnetic tape moving on the slide face are set in a specific range on the approaching and leaving sides of the tape, respectively.

Since the length of the slide face between the magnetic tape and the magnetic head is small and the tape wrap angles on the approaching and leaving sides of the magnetic tape are set in a proper, allowed range taking account of tension T and a guide distance, a spacing at the magnetic gap of the magnetic head and its change is small, so that a full electromagnetic converting characteristic can be maintained. As the tape wrap angles on the approaching and leaving sides of the magnetic tape need not to be the same, installation of the magnetic head to the apparatus is relatively easy and magnetic recording/reproducing at a high transfer rate and high recording density is satisfactorily made possible.

The foregoing and other objects, features, aspects and advantages of the present invention will become more apparent from the following detailed description of the present invention when taken in conjunction with the accompanying drawings.

BRIEF DESCRIPTION OF THE PREFERRED EMBODIMENTS

(1) First embodiment

Figure 1:
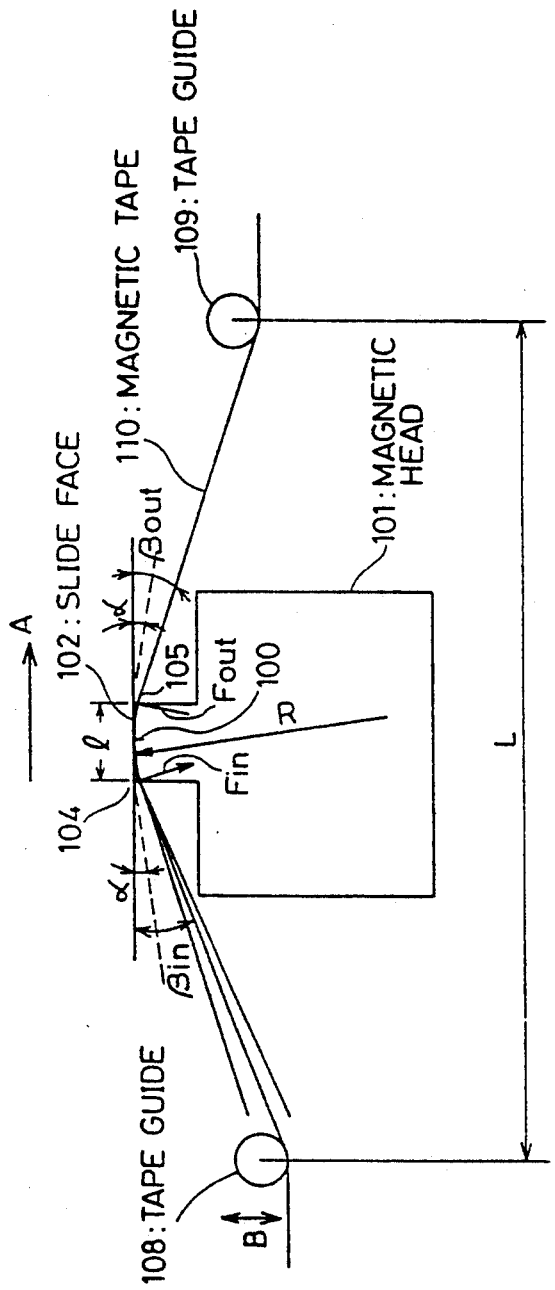
FIG. 1 is a diagram showing a structure according to first and second embodiments of the present invention.
Figure 16:
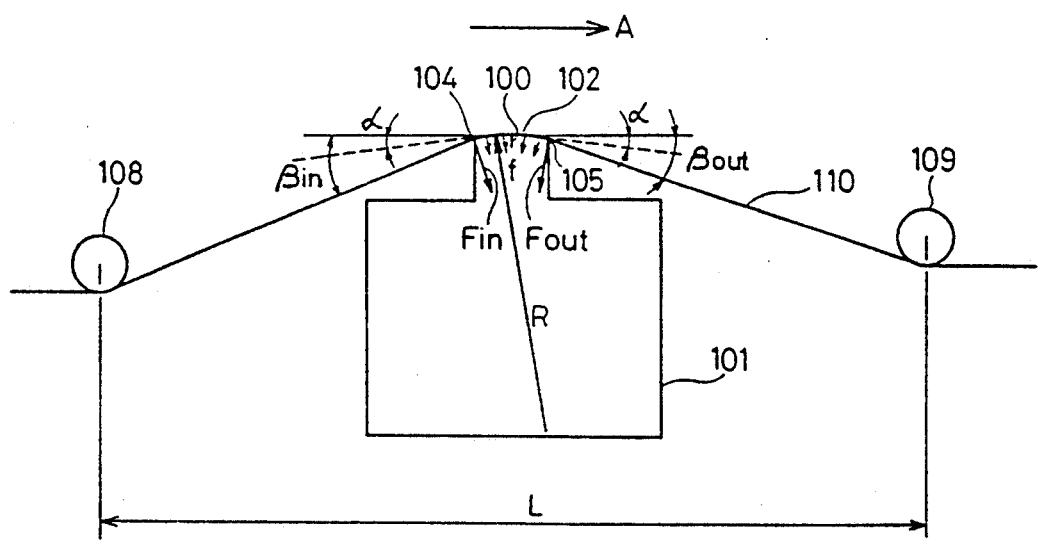
FIG. 16 shows a first example of magnetic recording/reproducing apparatus in the prior art.
Figure 17:
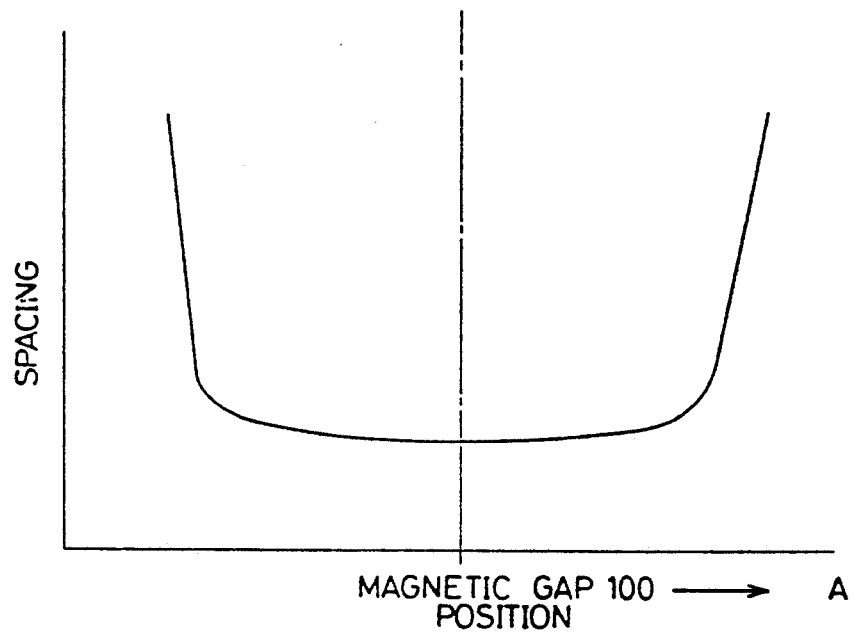
FIG. 17 shows a spacing distribution in the prior art of FIG. 16.
Figure 18:
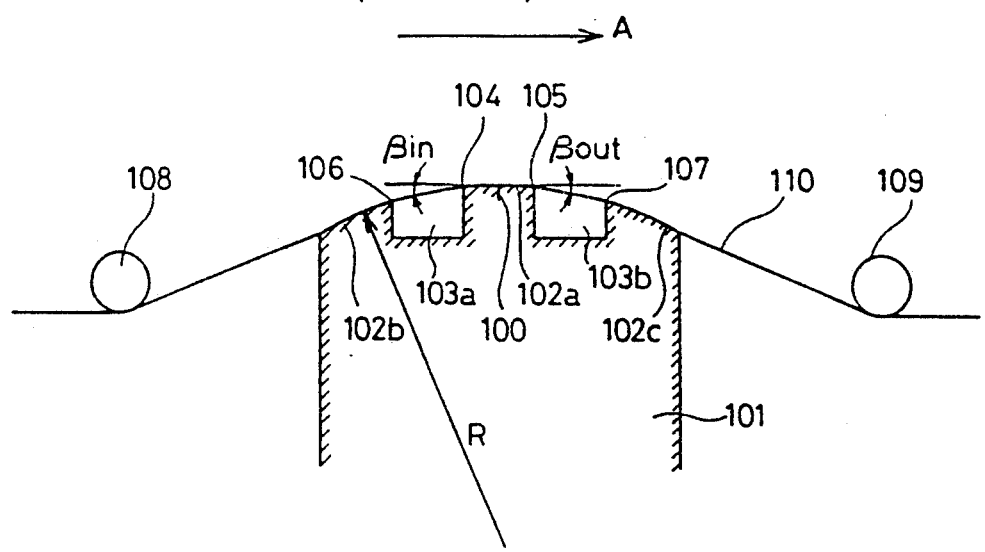
FIG. 18 shows a second example of magnetic recording/reproducing apparatus in the prior art.
Figure 19:
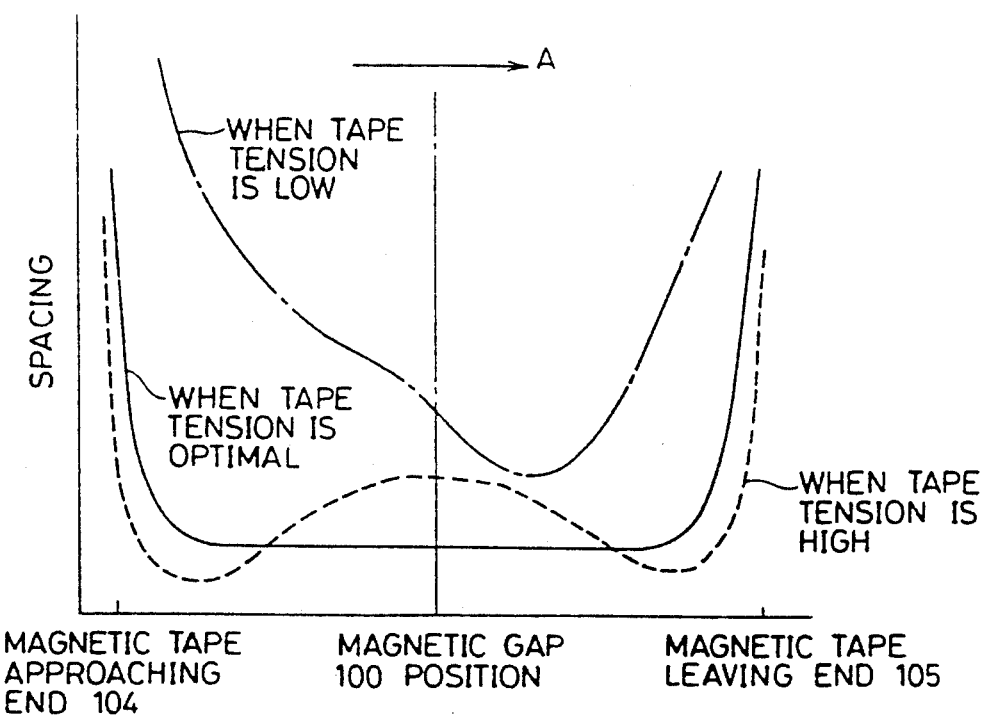
FIG. 19 is a diagram for describing a first problem in the prior art.
Figure 20:
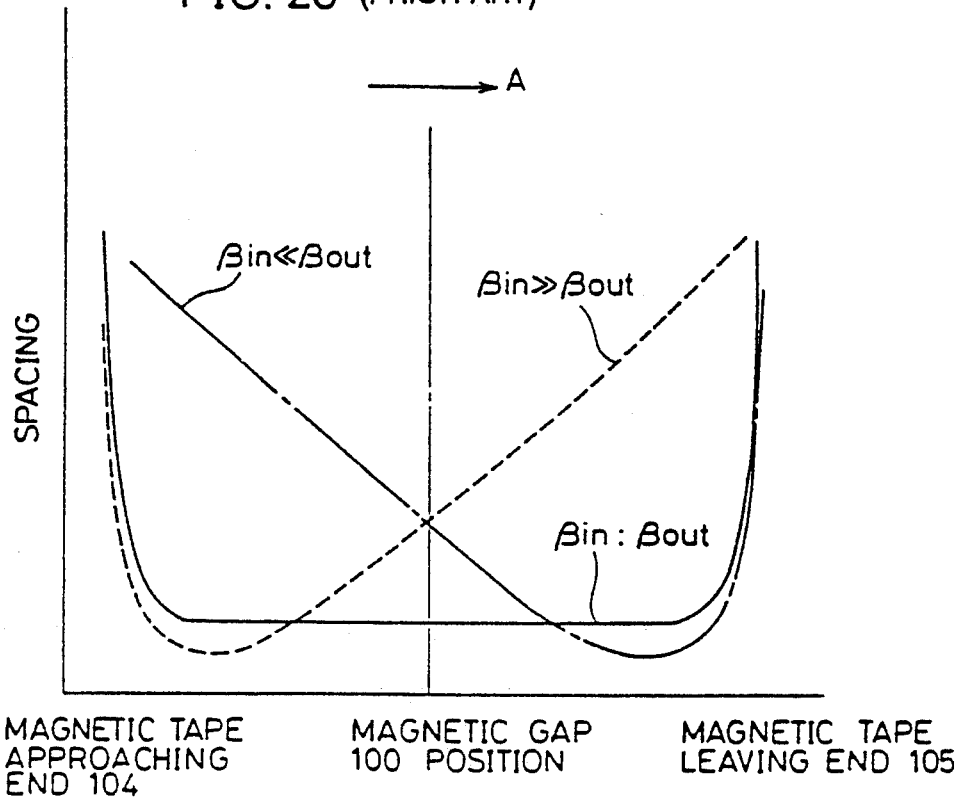
FIG. 20 is a diagram for describing a second problem in the prior art.
Figure 21:
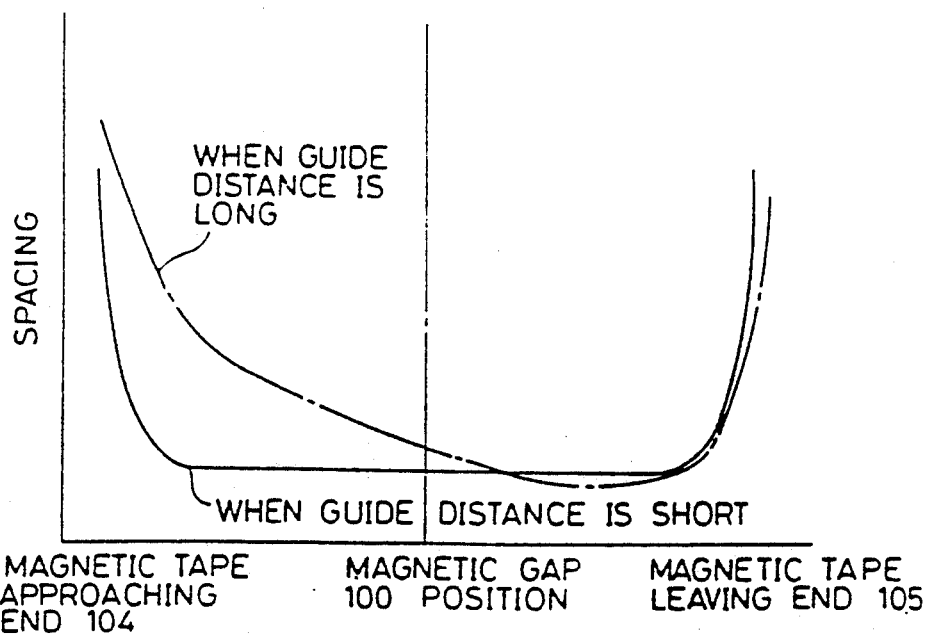
FIG. 21 is a diagram for describing a third problem in the prior art.

A first embodiment according to the present invention will now be described with reference to FIGS. 1-6 and 10. In the figures, the reference numerals will not be described here as they are the same as those shown in FIG. 16. In this case, a pair of tape guides 108, 109 having a distance L therebetween are used for setting tape wrap angles $\beta_{in}$, $\beta_{out}$, with a magnetic head 101 located substantially in the middle therebetween. Referring to FIG. 1, magnetic tape 101 is so controlled to move at a constant speed and with constant tape tension in the direction of the arrow A by a mechanism driving magnetic tape 110.

Figure 2:
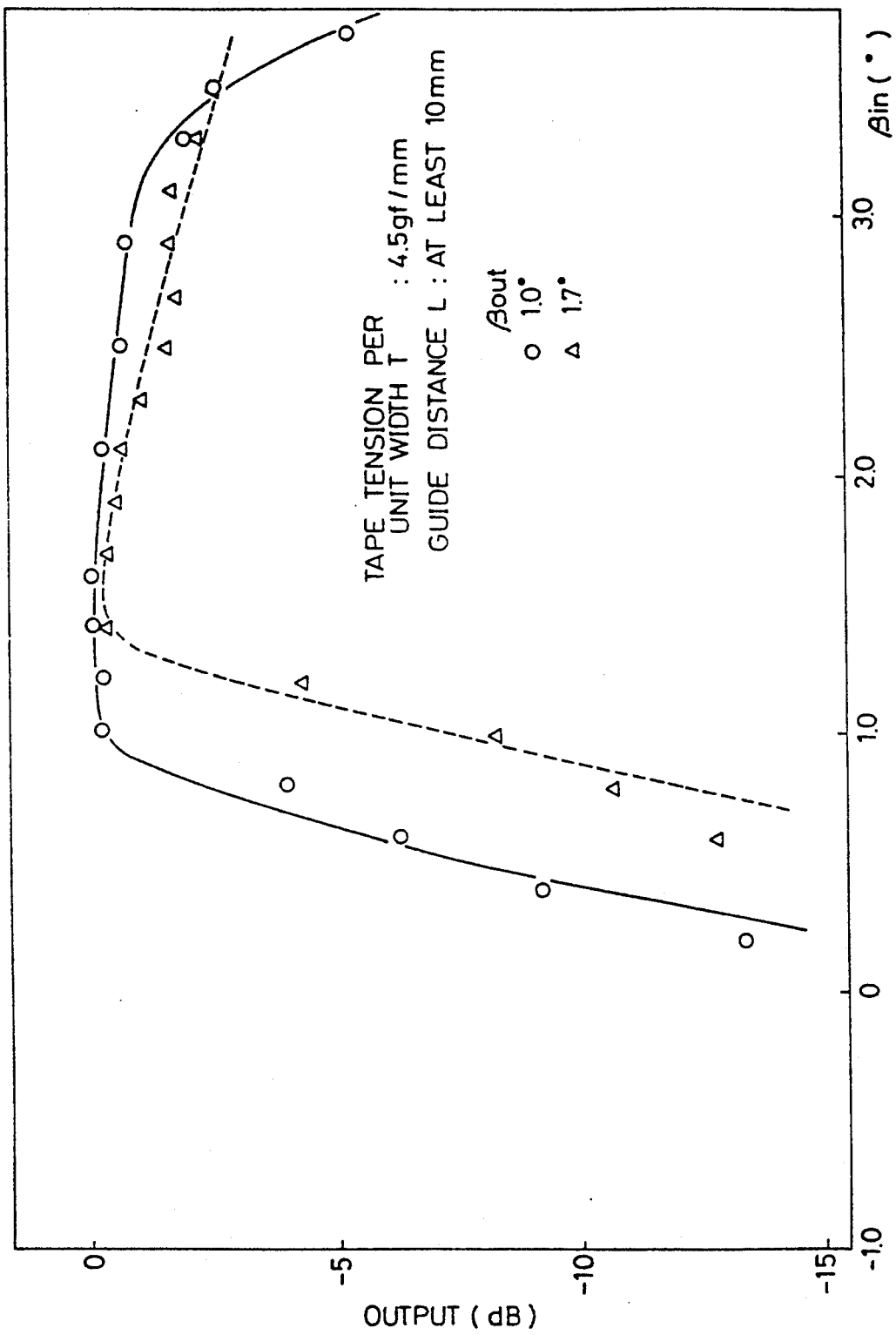
FIG. 2 shows a first example of an output characteristic relative to an approaching tape wrap angle $\beta_{in}$.
Figure 3:
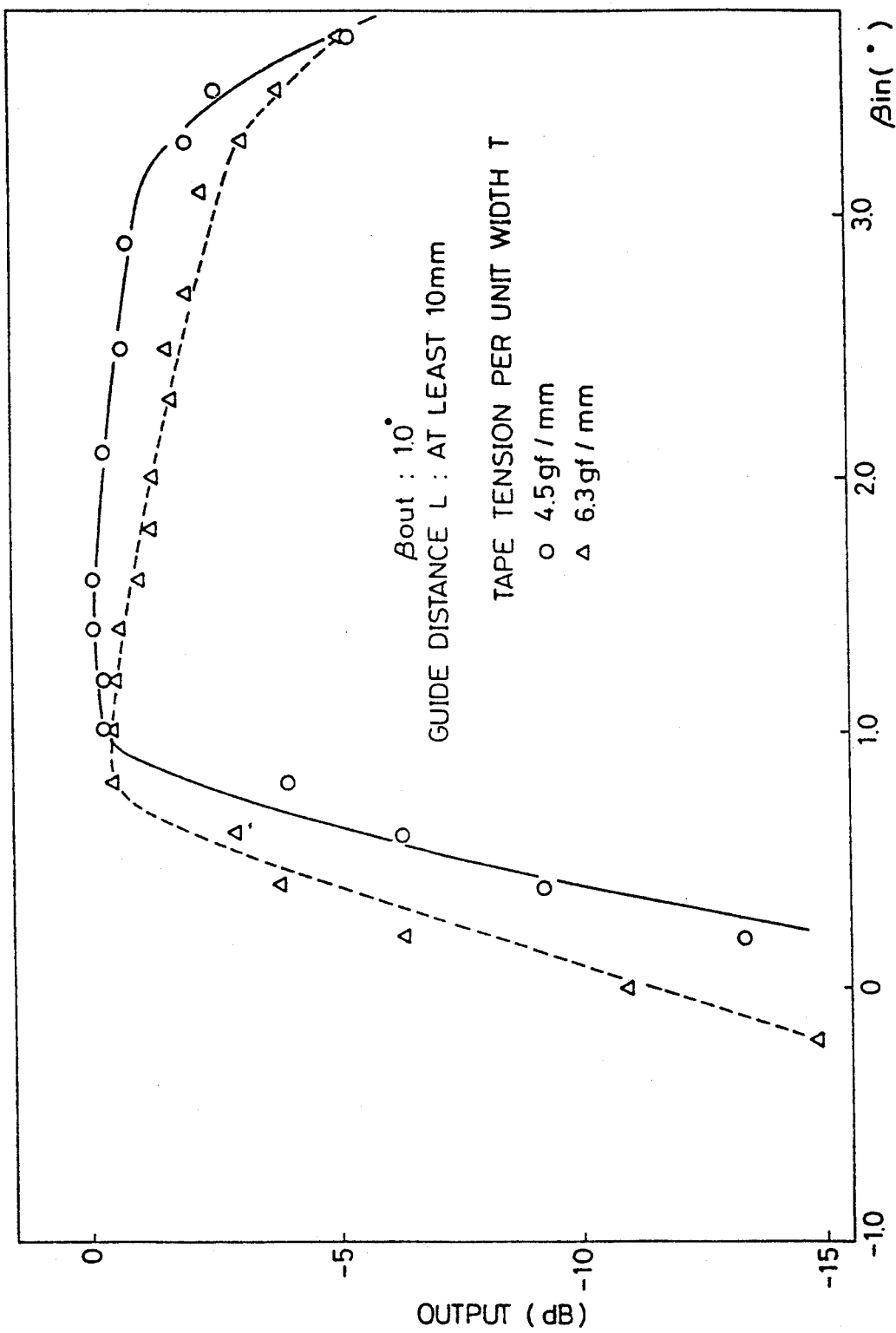
FIG. 3 shows a second example of an output characteristic relative to an approaching tape wrap angle $\beta_{in}$.
Figure 4:
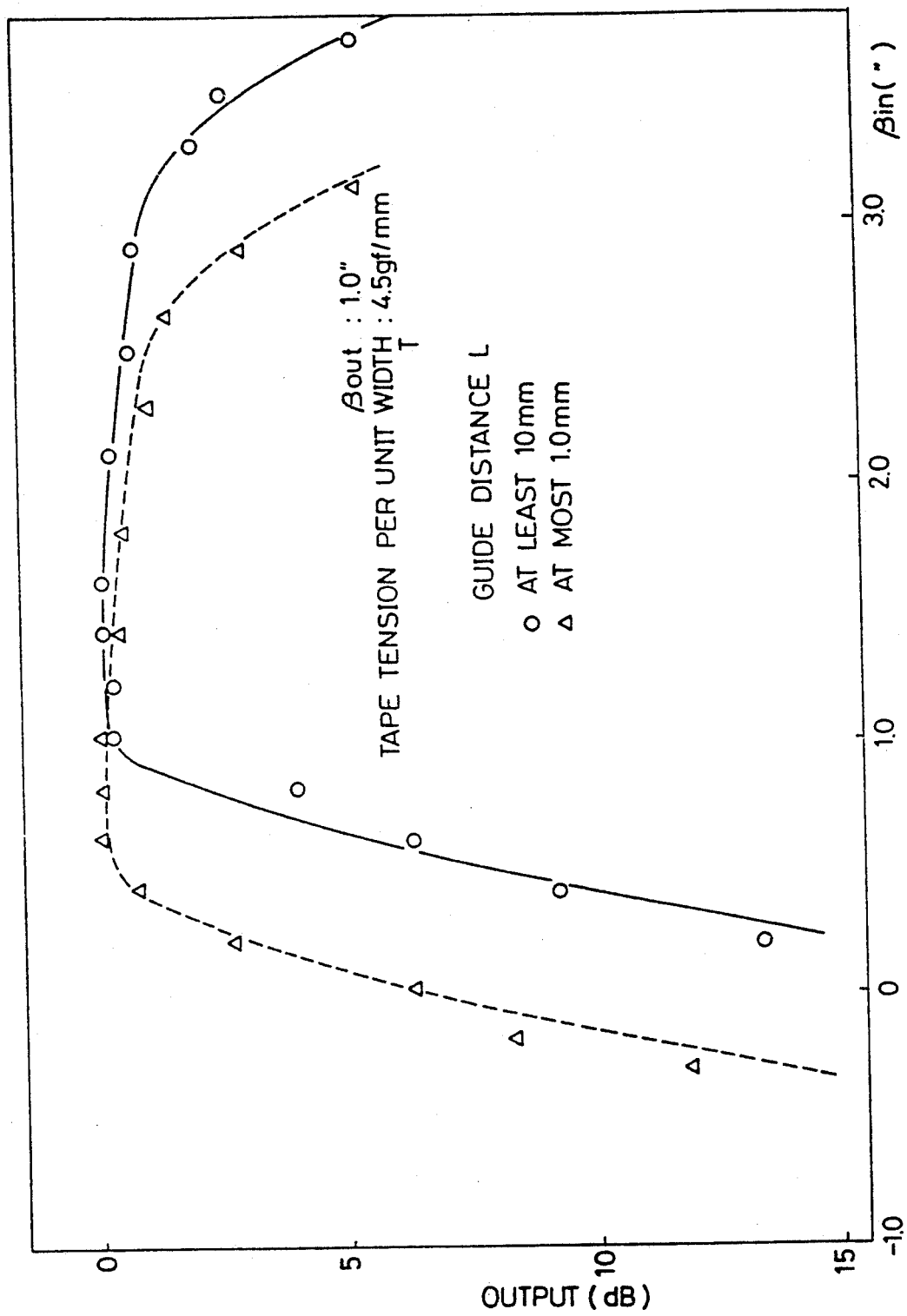
FIG. 4 shows a third example of an output characteristic relative to an approaching tape wrap angle $\beta_{in}$.

FIGS. 2-4 show the result of measurement of reproduction output in the arrangement described above (FIG. 1), with a leaving tape wrap angle ($\beta_{out}$) being constant (that is, tape guide 109 is fixed) and an approaching tape wrap angle $\beta_{in}$ being changed (that is, the position of tape guide 108 is moved in the direction indicated by the arrow B). In the measurement above, a magnetic head 101 of a cylindrical shape was used, with its curvature radius R being about 5.0 mm and the length $\lambda$ in the chordal direction being about 100 $\mu$m and magnetic gap 100 is located approximately at the center of the slide face.

Magnetic tape 110 with flexural stiffness (Young's modulus x geometrical moment of inertia) of 0.08gf·mm$^2$, on which data had been recorded with recording wavelength of 0.9 $\mu$m, was guided at a speed of 90 ips (inch per second). FIG. 2 shows changes of reproduction output relative to an approaching tape wrap angle $\beta_{in}$ with a leaving tape wrap angle $\beta_{out}$ being 1.0° and 1.7°, respectively. Tape tension T per unit width is 4.5 gf/mm and a distance L between the guides is 10 mm or above. In this case, the change of the reproduction output results from a change of a spacing loss due to a spacing between magnetic tape 110 and magnetic gap 100 in FIG. 1. As shown in the figure, the reproduction output changes with the change of $\beta_{in}$. The way it changes also varies with the value of $\beta_{out}$. This indicates that, in order to obtain a desired output value (to decrease the spacing), it is necessary to set the value of $\beta_{in}$ in a proper range according to the value of $\beta_{out}$ or to set the value of $\beta_{out}$ in a proper range according to the value of $\beta_{in}$. As previously described, since the output value (spacing at gap portion 100) is determined by the relation between tape wrap angles $\beta_{in}$, $\beta_{out}$, it is very effective, as a guide to set tape wrap angles $\beta_{in}$, $\beta_{out}$, to map out a range of the tape wrap angles $\beta_{in}$, $\beta_{out}$ where a desired output value is maintained. The range of tape wrap angles $\beta_{in}$, $\beta_{out}$ where a desired output value is maintained will be hereinafter referred to as "tape wrap angle proper range". As the tape wrap angle proper range varies with tape tension and a guide distance, a map must be made for tape tension and the guide distance, respectively. FIGS. 3 and 4 indicate that the output change relative to $\beta_{in}$ varied with the tape tension and the guide distance, respectively. The two curved lines of FIG. 3 were obtained under the same experimental conditions except the tape tension. The two curved lines of FIG. 4 were obtained under the same experimental conditions except the distance between the guide. From the foregoing, Maps were made showing tape wrap angle proper ranges for the tape tension and the distance between the guides and, furthermore, a range was formulated, taking account of the conditions of the tape tension and the distance between the guides. In mapping a proper range, a certain target output level was set as a desired output value.

Figure 5:
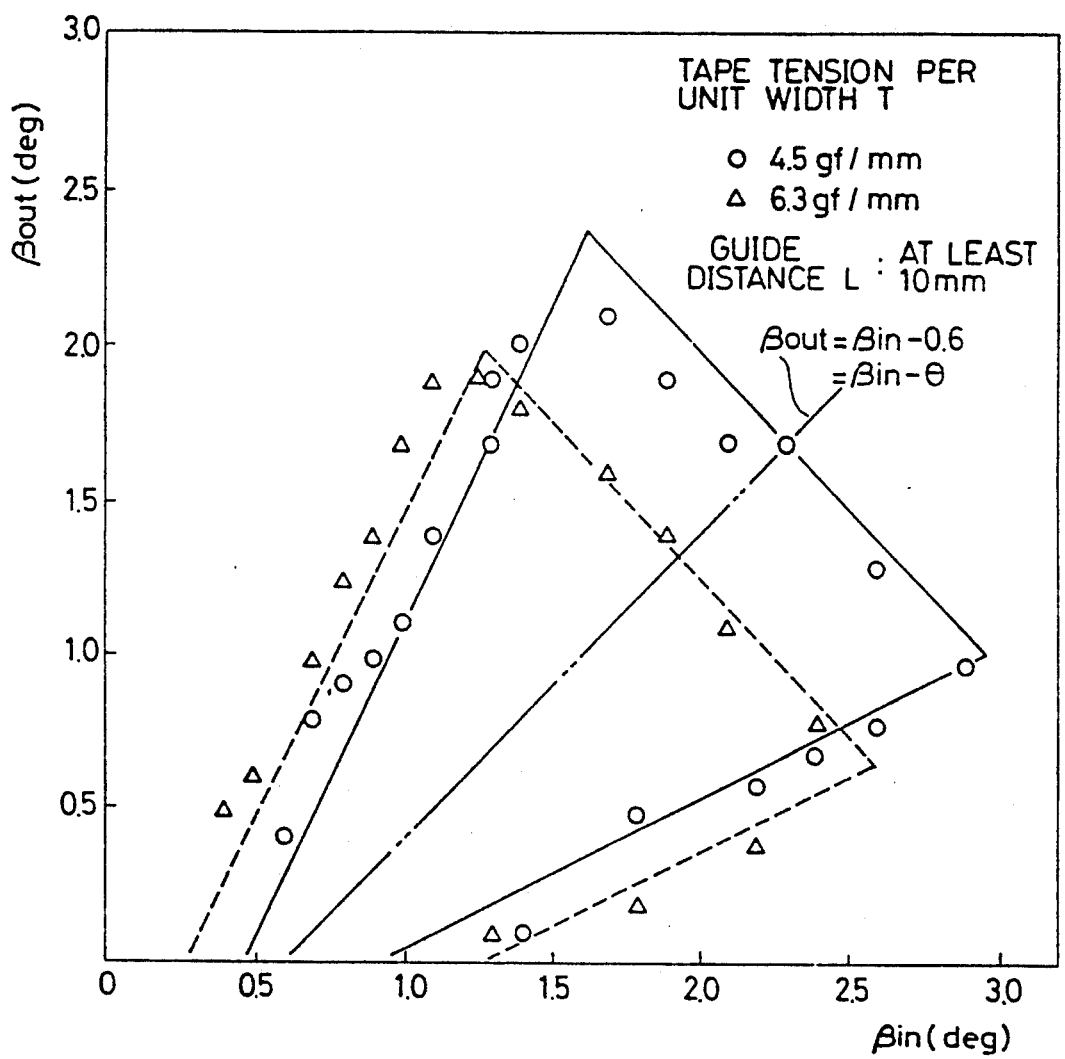
FIG. 5 shows a first example of a proper range of tape wrap angles ($\beta_{in}$, $\beta_{out}$).
Figure 6:
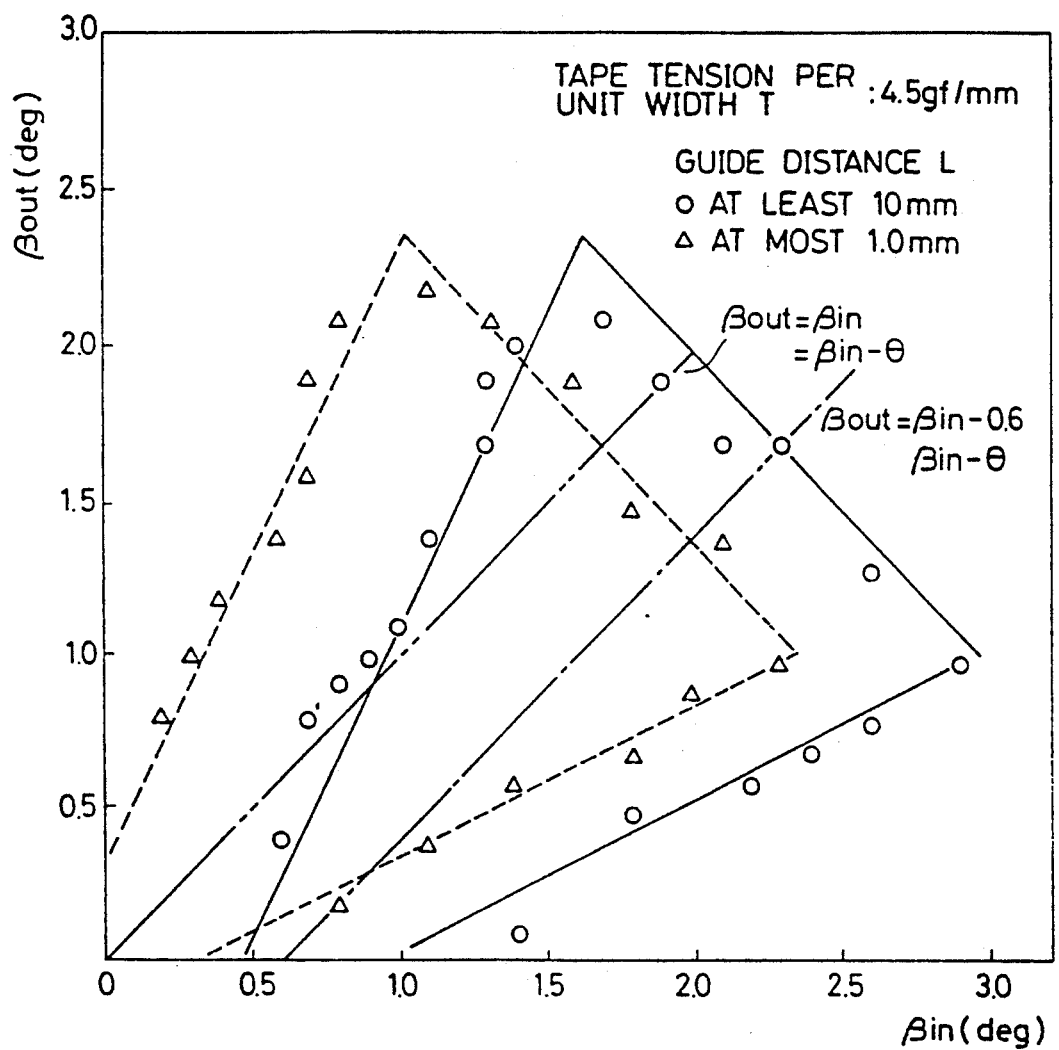
FIG. 6 shows a second example of a proper range of tape wrap angles ($\beta_{in}$, $\beta_{out}$).
Figure 10:
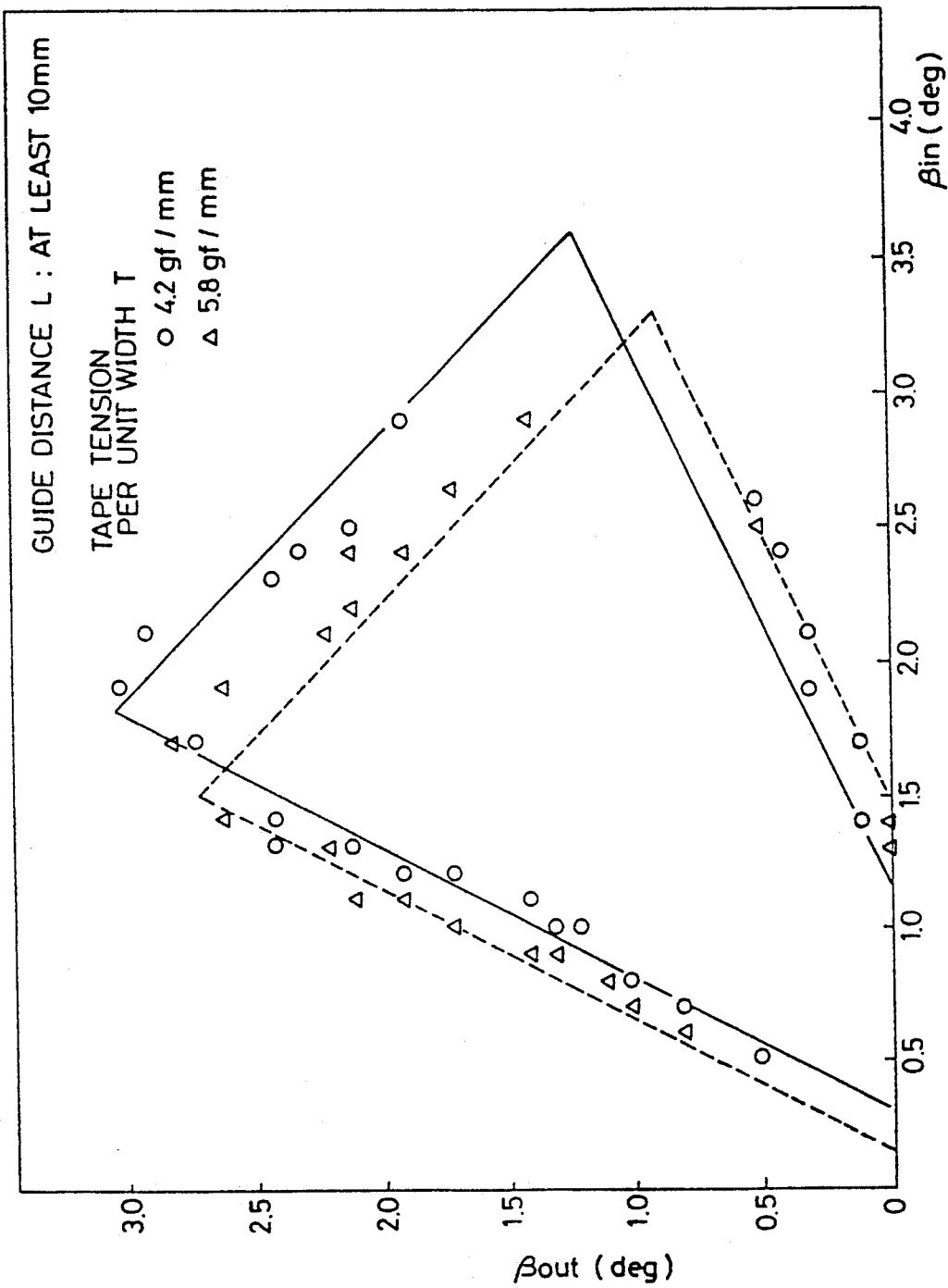
FIG. 10 shows a proper range of tape wrap angles ($\beta_{in}$, $\beta_{out}$) when such an output is aimed at that a spacing loss is within 2dB.

FIGS. 5 and 6 shows examples of maps with a target output level being such an output value that a reproducing spacing loss is within 1dB for recording wavelength of 0.9 $\mu$m. FIG. 10 shows an example of a map with a target output level being such an output value that the spacing loss is within 2dB. In this case, the spacing loss within 1dB is equivalent to the spacing between magnetic tape 110 and magnetic gap 100 in FIG. 1 being in the order of 15 mm or below. The spacing loss within 2dB is equivalent to the spacing in the order of 30 mm or below. Each plot in FIGS. 5 and 6 indicates values of tape wrap angles $\beta_{in}$, $\beta_{out}$ which provide such an output value (a minimum value of the target output level) that the spacing loss is 1dB. Each plot in FIG. 10 indicates values of tape wrap angles $\beta_{in}$, $\beta_{out}$ which provide such an output value (a minimum value of the target output level) that the spacing loss is 2dB. Each plot is created from data of FIGS. 2 to 4. In each figure, the solid line and the dotted line indicate approximate lines of the plots under the same condition (the same condition of the tape tension and the distance between the guides). The area surrounded by approximate lines of the same condition is a tape wrap angle proper range under the condition. The tape wrap angle proper range will specifically be described below.

Firstly, a description will be made of a case where an output value with the spacing loss within 1dB is set as a target output level.

FIG. 5 shows cases with the distance L between the guides being at least 10 mm and tape tension T per unit width being 4.5 gf/mm and 6.3 gf/mm. FIG. 6 shows cases with tape tension T per unit width being 4.5 gf/mm and the distance L between the guides being at least 10 mm and at most 1.0 mm. As shown in the figures, the tape wrap angle proper range varies with the tape tension and the distance between the guides, which has already been described above. The tape wrap angle proper range is expressed with a highly flexible general expression by indicating the approximate line of the plots as a function of tape tension T per unit width (gf/mm) and the distance L between the guides. The relational expression is as follows:

$$\begin{cases} 0.5\{(\beta_{in} - \theta) - \gamma\} \leq \beta_{out} - \gamma \leq 2\{(\beta_{in} - \theta) - \gamma\} & (4) \\ \text{and } (\beta_{in} - \theta) + \beta_{out} \leq 2\gamma + 4.0° & (5) \end{cases}$$

where $\gamma = -0.2(\text{deg} \cdot \text{mm/gf}) \times T(\text{gf/mm}) + 0.6°$ \qquad (6)

$$\theta = \begin{cases} 0° & (L: \text{at most } 1.0 \text{ mm}) \\ 0.6° & (L: \text{at least } 10 \text{ mm}) \end{cases} \quad (7)$$

That is, the spacing loss can be kept within 1dB if such tape wrap angles $\beta_{in}$, $\beta_{out}$ are set so that the expressions (4) and (5) are satisfied, using an angle $\theta$ obtained from the expression (7) according to the distance between the guides and an angle $\gamma$ obtained from the expression (6) for the tape tension T per unit width (gf/mm).

Although the expressions above (4) - (7) are given for the length $\lambda$ in the chordal direction of slide face 102 of magnetic head 101 being about 100 $\mu$m, the magnetic tape flexural stiffness 0.08 gf·mm² and the distance L between the guides at least 10 mm and at most 1.0 mm, if the condition is significantly different from that, the following expressions (4)', (5)' corresponding to the expressions (4), (5) hold:

$$K\{(\beta_{in}-\theta') - \gamma'\} \leq \beta_{out} -\gamma' \leq 1/K\{f\beta_{in}-\theta') - \gamma!\} \quad (4)'$$

$$(\beta_{in}-\theta') + \gamma_{out} \leq 2\gamma'+b \quad (5)'$$

(K, b: a constant, $\gamma'$: a variable determined by tape tension $\theta'$: a variable determined by the distance between the guides)

A description will now be made of a tape wrap angle proper range with such an output value that the spacing loss is within 2dB being a target output level. In this case, the tape wrap angle proper range is formulated in the same way as described above, using data of FIG. 10. The relational expression is as follows:

$$\begin{cases} 0.5\{(\beta_{in} - \theta) - \gamma_1\} \leq \beta_{out} - \gamma_1 \leq 2\{(\beta_{in} - \theta) - \gamma_1\} & (8) \\ \text{and } (\beta_{in} - \theta) + \beta_{out} \leq 2\gamma_1 + 5.4° & (9) \end{cases}$$

where $\gamma_1 = -0.2(\text{deg} \cdot \text{mm/gf}) \times T(\text{gf/mm}) + 0.25° \quad (10)$ $$\theta = \begin{cases} 0° & (L: \text{at most } 1.0 \text{ mm}) \\ 0.6° & (L: \text{at least } 10 \text{ mm}) \end{cases} \quad (11)$$

That is, the spacing loss can be controlled within 2dB if such tape wrap angles $\beta_{in}$, $\beta_{out}$ that satisfy the expressions (8), (9) are set using an angle $\theta$ obtained from the expression (11) according to the distance L between the guides and an angle $\gamma_1$ given by the expression (10) for tape tension T per unit width (gf/mm).

While the expressions (4) - (7), (4)', (5)' and (8) - (11) explain the basic structure according to the present invention, these relational expressions can be more widely applicable by further adding new conditions to them. One example of it will now be described below as a second embodiment.

(2) Second embodiment

Although a description is made here of a case where the previous expressions (4) - (7) and FIGS. 5 and 6 (a tape wrap angle proper range with such an output that the spacing loss is within, 1dB is set as a target output level) are used, the same operation can be applicable to other expressions (4)', (5)' and (8) - (11).

Firstly, referring back to the expressions (4) - (7), these relational expressions can be applied in a case where $\beta_{out}$ is set for a certain $\beta_{in}$ or $\beta_{in}$ is set for a certain $\beta_{out}$. In taking account of processes of manufacturing a magnetic head and installing the magnetic head to the apparatus, generally, a target value and setting margin is given for each of $\beta_{in}$, $\beta_{out}$ and then $\beta_{in}$, $\beta_{out}$ are set within the range without depending on the correlation therebetween. The setting margin of $\beta_{in}$ is usually as wide as that of $\beta_{out}$. The ranges of $\beta_{in}$, $\beta_{out}$ above will be hereinafter referred to as "setting range". In this case, in order to obtain a maximum setting range, setting may be such that satisfies the following expressions derived using the expressions (4), (5):

$$\begin{cases} \{(\gamma + 1.5) + \theta\} - 0.5 \leq \beta_{in} \leq \{(\gamma + 1.5) + \theta\} + 0.5 & (12) \\ (\gamma + 1.5) - 0.5 \leq \beta_{out} \leq (\gamma + 1.5) + 0.5 & (13) \end{cases}$$

Here, angles $\gamma$, $\theta$ are the same as those obtained from the expressions (6), (7).

Figure 7:
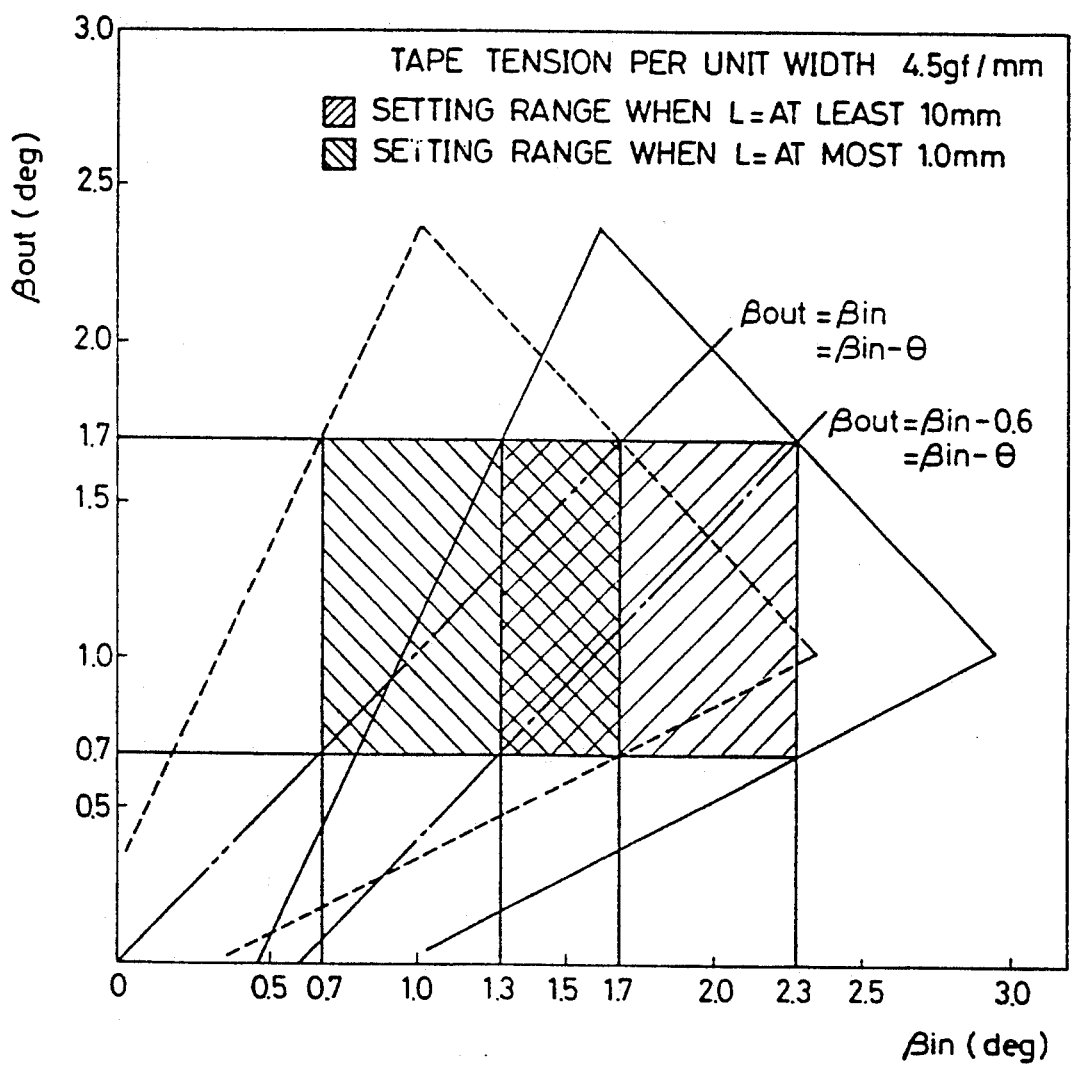
FIG. 7 shows an example of a setting range of tape wrap angles ($\beta_{in}$, $\beta_{out}$).

FIG. 7 shows appropriate ranges of $\beta_{in}$, $\beta_{out}$ (the expressions (4) - (7)) under the two conditions of FIG. 6 and setting ranges of $\beta_{in}$, $\beta_{out}$ indicated by the expressions (12), (13), which correspond to two regions surrounded by squares with oblique lines. That is, in a case where the tape tension T per unit width is 4.5 gf/mm, the spacing loss can be controlled within 1dB and maximum setting margins of $\beta_{in}$, $\beta_{out}$ can be both 1.0° by setting $\beta_{in}$, $\beta_{out}$ so that, if the distance L between the guides is 10 mm or more, $$\begin{cases} 1.8 - 0.5 \leq \beta_{in} \leq 1.8 + 0.5 \\ 1.2 - 0.5 \leq \beta_{out} \leq 1.2 + 0.5 \end{cases}$$

that is, $$1.3 \leq \beta_{in} \leq 2.3 \quad (14)$$

$$0.7 \leq \beta_{out} \leq 1.7 \quad (15)$$

while, if the distance L between the guides is 1.0 mm or less, $$\begin{cases} 1.2 - 0.5 \leq \beta_{in} \leq 1.2 + 0.5 \\ 1.2 - 0.5 \leq \beta_{out} \leq 1.2 + 0.5 \end{cases}$$

that is, $$0.7 \leq \beta_{in} \leq 1.7 \quad (16)$$

$$0.7 \leq \beta_{out} \leq 1.7 \quad (17)$$

As obvious from the expressions (12) - (17), a target value of $\beta_{in}$ to be set must be larger than a target value of $\beta_{out}$ to be set by the angle $\theta$.

This fact is understood by the fact that proper ranges of $\beta_{in}$ and $\beta_{out}$ in FIGS. 5-7 are axial symmetrical with respect to the line defined by $\beta_{out} = \beta_{in} - \theta$.

A description will now be made of magnetic tape 110 in the arrangement of FIG. 1 moving in both directions, with reference to FIGS. 8 and 9.

Figure 8:
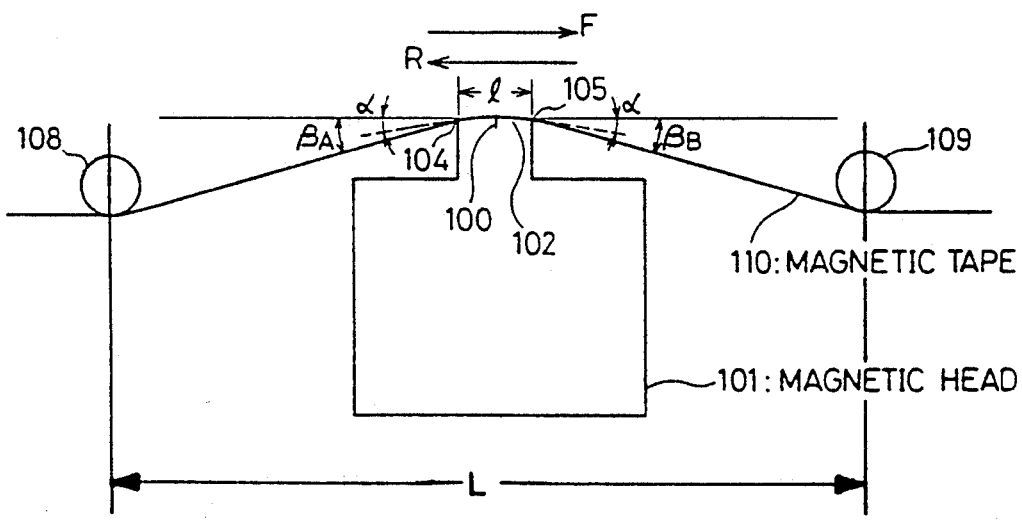
FIG. 8 is a diagram for describing a magnetic tape moving in both directions.

In FIG. 8, let a tape wrap angle on the left hand side in the figure be $\beta_A$ and a tape wrap angle on the right hand side be $\beta_B$. When magnetic tape 110 moves in the direction indicated by F, $\beta_A$ corresponds to $\beta_{in}$ and $\beta_B$ is $\beta_{out}$ while when it moves in the direction indicated by R, $\beta_A$ is $\beta_{out}$ and $\beta_B$ is $\beta_{in}$. This is shown in the following table.

TABLE 1

| tape wrap angle | moving direction | |
| --- | --- | --- |
| | F | R |
| $\beta_A$ | $\beta_{in}$ | $\beta_{out}$ |
| $\beta_B$ | $\beta_{out}$ | $\beta_{in}$ |

Figure 9:
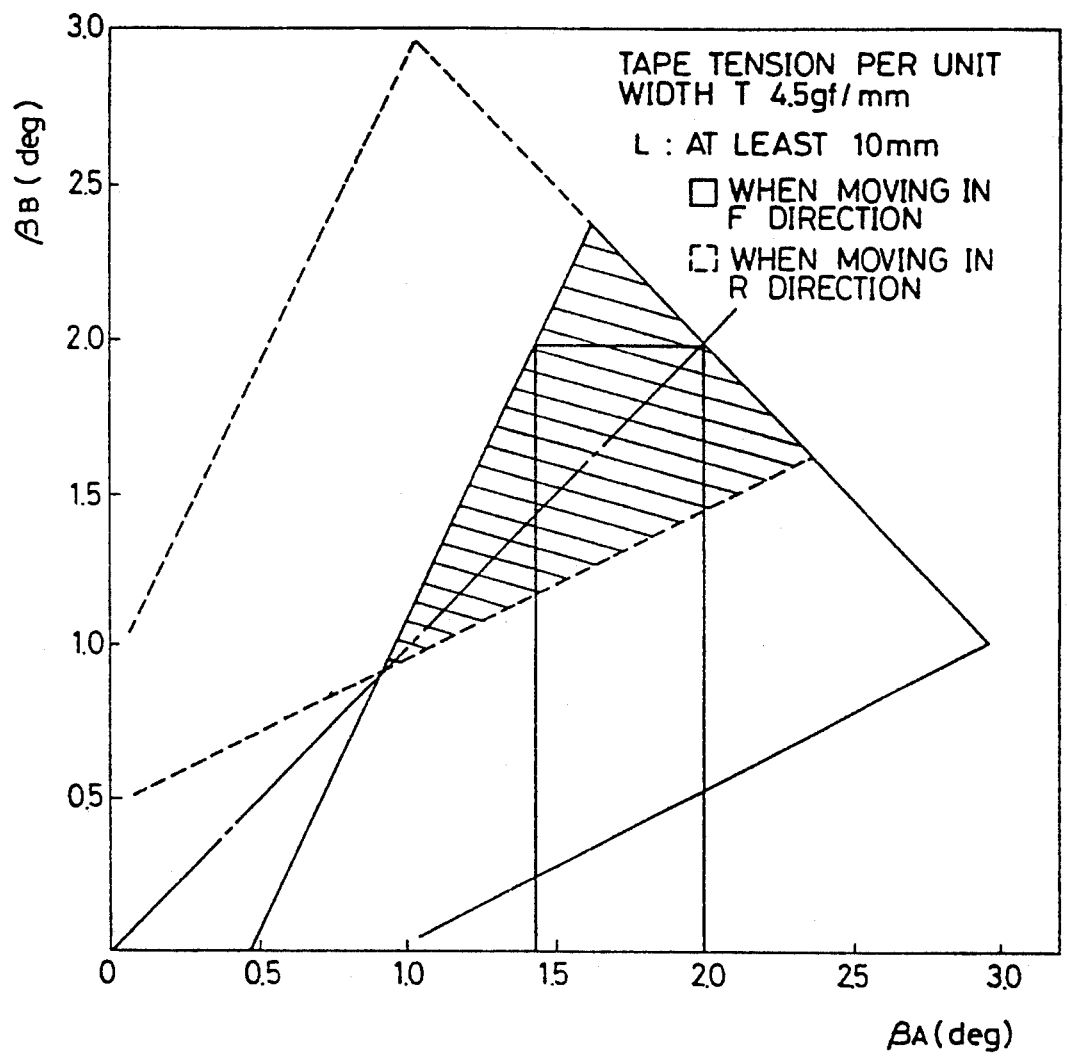
FIG. 9 shows an example of a proper range and a setting range of tape wrap angles ($\beta_{in}$, $\beta_{out}$) when a magnetic tape is moving in both directions.

FIG. 9 shows a proper range (an area surrounded by the solid line in the figure) of tape wrap angles $\beta_A$, $\beta_B$ when the tape moves in the direction of F and a proper range (an area surrounded by the dotted line in the figure) of the tape wrap angles when it moves in the direction of R with tape tension T per unit width of 4.5 gf/mm and the guide distance L of 10 mm or more, using the expressions (4) – (7). The area (the area with oblique lines in the figure) where they overlap each other is a proper range of the tape wrap angles $\beta_A$, $\beta_B$ which is adapted for movement in both directions (movement in F and R directions). This can be indicated by the following expressions derived from the expressions (4), (5):

$$\begin{cases} 0.5\{\beta_A - (2\theta + \gamma)\} \leq \beta_B - (2\theta + \gamma) \leq \\ 2\{\beta_A - (2\theta + \gamma)\} \\ \text{and } \beta_A + \beta_B - \theta \leq 2\gamma + 4.0 \end{cases} \quad (18)$$
$$(19)$$

In the expressions (18), (19), the angles $\gamma$, $\theta$ are the same as those shown in the expressions (6), (7).

For movement of magnetic tape 110 in the both directions, in the same manner as stated above, a setting range of the tape wrap angles $\beta_A$ and $\beta_B$ is obtained so that their setting margins are of the same width and also the greatest, which is indicated by the following relational expression derived from the expressions (18), (19):

$$\{(\gamma+1.5) + (7/8)\theta\} - \{0.5 - (3/8) \times \theta\} \leq \beta_A, \beta_B \leq$$
$$\{(\gamma+1.5) + (7/8)\theta\} + \{0.5 - (3/8)\theta\} \quad (20)$$

As have been described in the first and second embodiments, a desired output value (spacing characteristic) can be obtained by setting the tape wrap angles in the proper range indicated by the expressions (4) – (7) and the proper range indicated by the expressions (18), (19) according to the guide distance and the tape tension for movement of the magnetic tape in one direction and in both directions, respectively. A desired output value can also be obtained according to the setting range indicated by the expressions (12), (13) and the setting range indicated by the expression (20) for movement in one direction and both directions, respectively, if it is necessary to set target values and setting margins of the tape wrap angles in advance.

(3) Third embodiment

While a description was made of cases where tape guides 108, 109 were used as guides for setting the tape wrap angles $\beta_{in}$, $\beta_{out}$ or $\beta_A$, $\beta_B$ in the first and second embodiments, setting of the tape wrap angles can be made easier by providing guides on magnetic head 101 itself. A third embodiment using such guides is shown in FIGS. 11–15.

Figure 11:
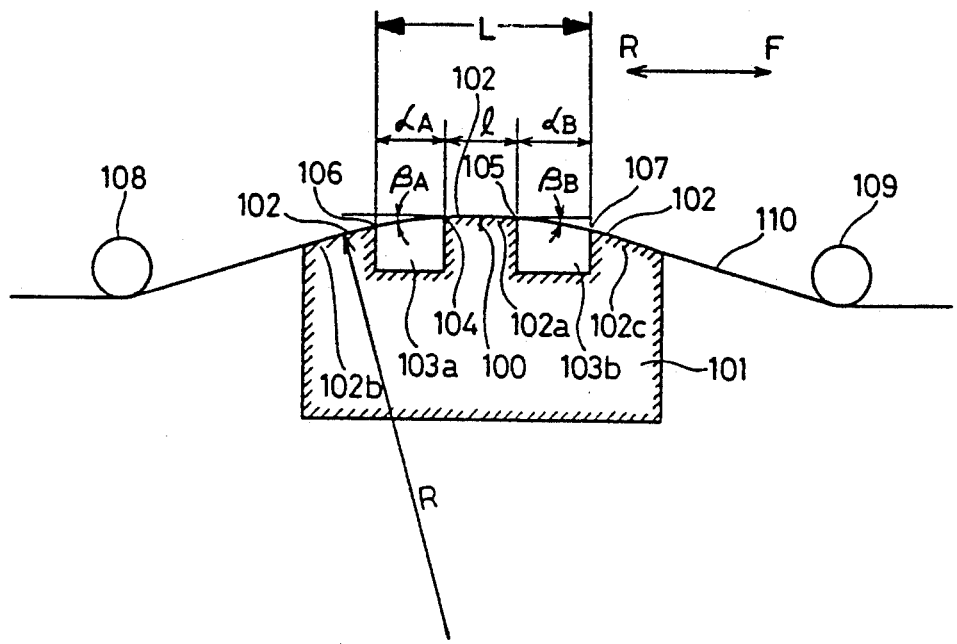
FIG. 11 is a diagram showing a structure according to a third embodiment of the present invention.

FIG. 11 is a diagram showing a head portion according to the third embodiment. In the figure, a magnetic head 101 includes a slide face 102 of a cylindrical shape having a magnetic gap 100. Slots 103a, 103b extending at right angles with the movement direction of magnetic tape 110 are formed on both sides of magnetic gap 100 on slide face 102. Slide face 102 is divided into three raised faces 102a, 102b and 102c by slots 103a, 103b.

In this case, when magnetic tape 110 is guided as far as raised faces 102b and 102c by tape guides 108, 109, magnetic tape 110 is restricted by both ends 104, 105 of raised face 102a (corresponding to slide face 102 in FIGS. 1 and 8) having magnetic gap 100 and ends 106, 107 of raised faces 102b, 102c (corresponding to tape guides 108, 109 in FIGS. 1 and 8) serving as guides, so that tape wrap angles on raised face 102a are stably set, i.e., $\beta_A$, $\beta_B$ in the figure.

The tape wrap angles $\beta_A$, $\beta_B$ can be indicated by the following expressions:

$$\beta_A = \sin^{-1}\left(\frac{l + d_A}{2R}\right) \quad (21)$$

$$\beta_B = \sin^{-1}\left(\frac{l + d_B}{2R}\right) \quad (22)$$

where R is a radius of the curvature of slide face 102, $\lambda$ is a length of raised face 102a in the chordal direction, $d_A$ is a width of slot 103a and $d_B$ is a width of slot 103b.

Accordingly, a desired output value can be obtained by setting the tape wrap angles $\beta_A$, $\beta_B$ given by the expressions (21), (22), which is determined by the configuration of slide face 102, so that they satisfy the expressions (4) – (7), (8) – (11), (12), (13), (18), (19) and (20) depending on whether magnetic tape 110 moves in one direction or both directions.

(4) Fourth embodiment

Figure 12:
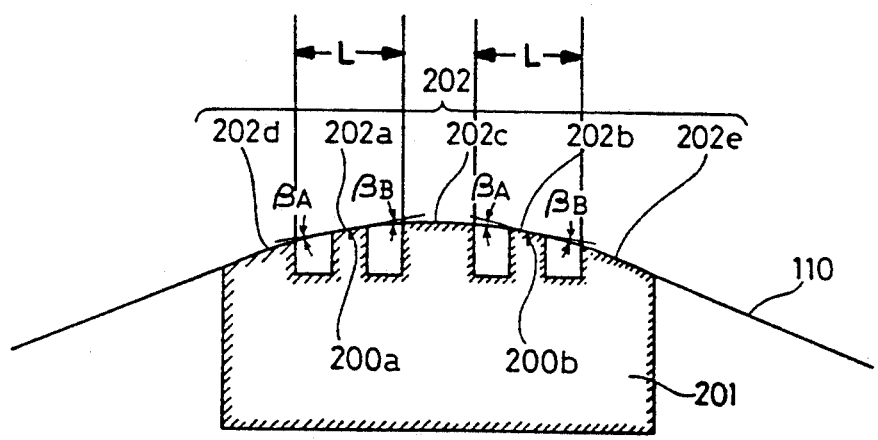
FIG. 12 is a diagram showing a structure according to a fourth embodiment of the present invention.
Figure 13:
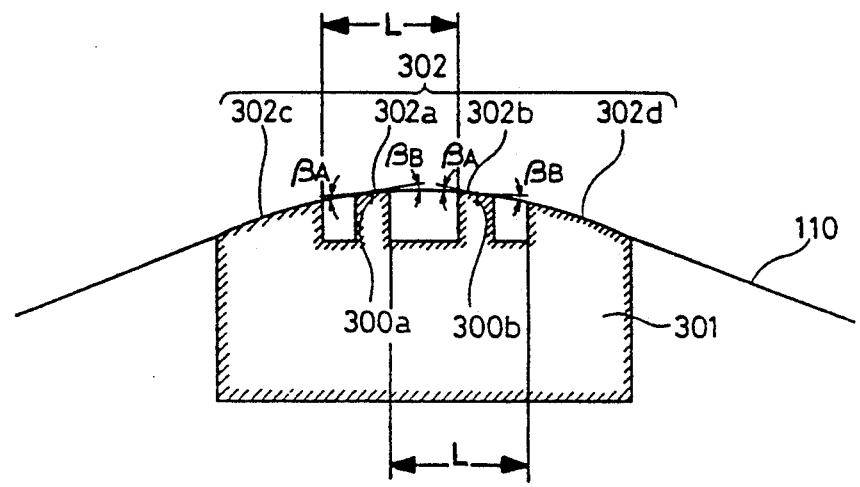
FIG. 13 is a diagram showing a structure according to the fourth embodiment of the present invention.

FIGS. 12 and 13 show a fourth embodiment in connection with guides. In this embodiment, there are formed two magnetic gaps 200a, 200b or 300a, 300b and four or three slots extending at right angles with the movement direction of a magnetic tape 110 on slide faces 202 and 302 of a cylindrical shape in magnetic heads 201 or 301, respectively. The wrap angles of magnetic tape 110 on raised slide faces 202a, 202b or 302a, 302b having the magnetic gaps are set in the configuration of slide faces 202 and 302.

(5) Fifth embodiment

Although a case of a single magnetic head with guides has been described in the third and fourth embodiments, the present invention can also be applied to a case where a plurality of magnetic heads are combined.

A fifth embodiment will now be described below.

Figure 14:
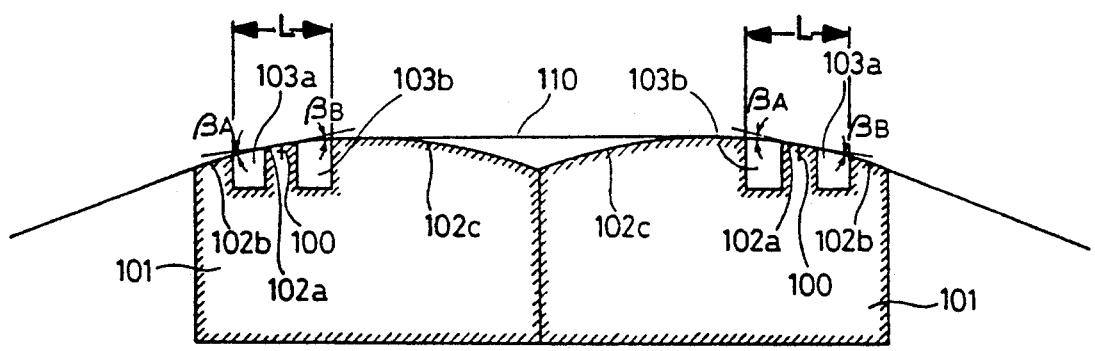
FIG. 14 is a diagram showing a structure according to a fifth embodiment of the present invention.
Figure 15:
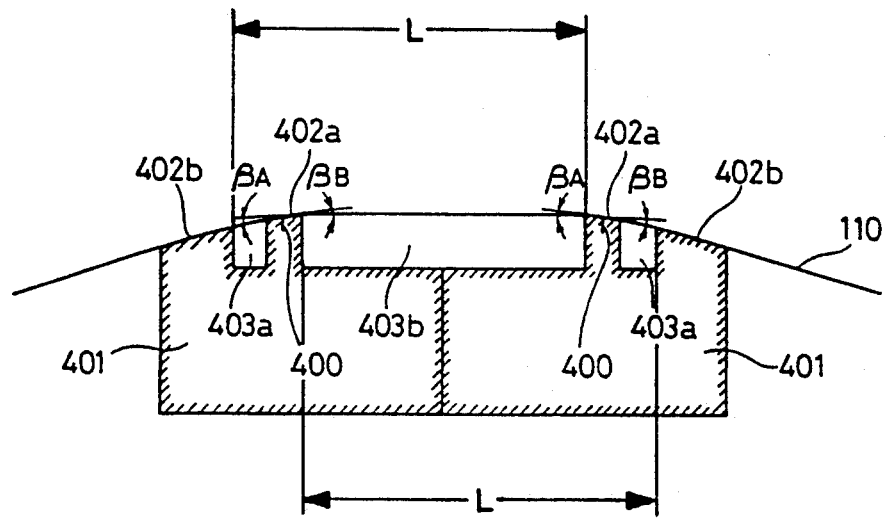
FIG. 15 is a diagram showing a structure according to the fifth embodiment of the present invention.

FIG. 14 shows composite magnetic heads 101 (FIG. 11) as one modification of the third embodiment. FIG. 15 shows adjacent magnetic heads 401 combined, serving as part of guides. In FIG. 15, magnetic heads 401 are combined, having cylindrical slide faces 402 including magnetic gaps 400 and slots 403a, 403b extending in a direction at right angles with the movement direction of a magnetic tape 110 on both sides of magnetic gaps 400, with raised slide faces 402a having magnetic gaps 400 being adjacent to each other. Here, the wrap angles of magnetic tape 110 on raised faces 402a are determined according to the configurations of slide faces 402 and the state in which they are combined together.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Magnetic recording/reproducing apparatus including a magnetic head of a cylindrical shape having a magnetic gap on a magnetic tape slide face the length of which in the chordal direction is at most 150 μm and guide means for defining a state in which a magnetic tape is wrapped on said slide face, said magnetic recording/reproducing apparatus being so structured that the following relationship is satisfied:

$\beta_{in}$ and $\beta_{out}$ are angles in degrees between a direction of a chord joining both ends of said slide face and movement directions of the magnetic tape coming in and out of contact with said slide face, T(gf/mm) is tension per unit width of said magnetic tape, and $\theta$ is an angle which is set according to a distance between said guide means, and $$\begin{cases} 0.5\{(\beta_{in} - \theta) - \gamma\} \leq (\beta_{out} - \gamma) \leq 2\{(\beta_{in} - \theta) - \gamma\} \\ \text{and } (\beta_{in} - \theta) + \beta_{out} \leq 2\gamma + 4.0° \end{cases}$$

where $\gamma = -0.2$ (deg·mm/gf) $\times$ T(gf/mm) + 0.6°.

2. Magnetic recording/reproducing apparatus including a magnetic head of a cylindrical shape having a magnetic gap on a magnetic tape slide face the length of which in the chordal direction is at most 150 μm and guide means for defining a state in which a magnetic tape is wrapped on said slide face, said magnetic recording/reproducing apparatus being so structured that the following relationship is satisfied:

$\beta_{in}$ and $\beta_{out}$ are angles in degrees between a direction of a chord joining both ends of said slide face and movement directions of the magnetic tape coming in and out of contact with said slide face, T(gf/mm) is tension per unit width of the magnetic tape, and $\theta$ is an angle which is set according to a distance between the guide means, and $$\begin{cases} 0.5\{(\beta_{in} - \theta) - \gamma_1\} \leq \beta_{out} - \gamma_1 \leq 2\{(\beta_{in} - \theta) - \gamma_1\} \\ \text{and } (\beta_{in} - \theta) + \beta_{out} \leq 2\gamma_1 + 5.4° \end{cases}$$

where $\gamma_1 = -0.2$ (deg·mm/gf) $\times$ T(gf/mm) + 0.25°.

3. The magnetic recording/reproducing apparatus according to claim 1 or 2, wherein the angle $\theta$ is set to 0° if the distance between the guide means is at most 1mm.

4. The magnetic recording/reproducing apparatus according to claim 1 or 2, wherein the angle $\theta$ is set to 0.6° if the distance between the guide means is at least 10 mm.

5. The magnetic recording/reproducing apparatus according to claim 1 or 2, wherein said slide face of said magnetic head is divided into a plurality of head portions by a plurality of slots spaced from each other, and the head portions formed on both sides of a head portion having the magnetic gap serve as said guide means.

6. The magnetic recording/reproducing apparatus according to claim 1 or 2, including a plurality of said magnetic heads provided adjacent to each other.

7. The magnetic recording/reproducing apparatus according to claim 5, including a plurality of said magnetic heads provided adjacent to each other.

* * * * *